United States Patent [19]

Kinghorn

[11] Patent Number: 4,485,437
[45] Date of Patent: Nov. 27, 1984

[54] TESTING THE PRESENCE OF A PERIPHERAL DEVICE

[75] Inventor: John R. Kinghorn, Sutton, England

[73] Assignee: U.S. Philips Corporation, New York, N.Y.

[21] Appl. No.: 387,117

[22] Filed: Jun. 10, 1982

[30] Foreign Application Priority Data

Jun. 26, 1981 [GB] United Kingdom ............... 8119756

[51] Int. Cl.³ .............................................. G06F 1/00
[52] U.S. Cl. ................................................. 364/200
[58] Field of Search ........................ 364/200 MS File

[56] References Cited

U.S. PATENT DOCUMENTS 4,025,906 5/1977 Riikonen ............................ 364/200

Primary Examiner—Raulfe B. Zache
Attorney, Agent, or Firm—James J. Cannon, Jr.

[57] ABSTRACT

Digital data apparatus comprising a processing unit which can have access to different numbers of memory units over a common data bus. The processing unit can address selectively the memory units with address codes over an address bus. An address code is valid when there is a corresponding memory unit and invalid when no memory unit is provided in respect of it. The validity of an address code is determined in the processing unit by comparing it with a corresponding identification code read from a memory unit addressed by the code. In order to prevent line capacitance on the data bus simulating identification codes to produce an incorrect comparison, one line of the data bus is given the inverse data bit to that of an expected identification code to overcome any spurious bit due to line capacitance. If the identification code is present, the correct data bit in it prevails over the inverse data bit, resulting in a correct validity comparison. If there is no identification code, because there is no memory unit corresponding to the address code concerned, the inverse data bit remains, resulting in correct invalidity comparison.

12 Claims, 4 Drawing Figures

TESTING THE PRESENCE OF A PERIPHERAL DEVICE

BACKGROUND OF THE INVENTION

1. Field of the Invention

This invention relates to digital data apparatus of a character comprising a data processing unit and a plurality of peripheral units selectively addressable by the data processing unit for the transfer of digital data between the data processing unit and an addressed peripheral unit.

The invention relates more particularly to specific apparatus of the above character in which the data processing unit is a digitally operable processing unit and the peripheral units are random access memory units, although it will be apparent to one skilled in the art that the application of the invention to other forms of apparatus of the above character is possible.

2. Description of the Prior Art

Commonly, a (digitally operable) processing unit is implemented as an integrated circuit in a package, with connection to one or more (random access) memory units external to the integrated circuit package being effected by way of external connecting pins on the package. With such an implementation, it may be a requirement to accommodate connection between the processing unit and different numbers of memory units, according to particular uses of the apparatus.

However, in order to prevent any attempt by the processing unit to transfer data to a non-existent memory unit, it becomes necessary for the processing unit to detect which memory unit addresses are valid for selectively addressing memory units that are actually provided and which memory unit addresses are invalid because no memory units have been provided in respect to them.

A variety of arrangements for distinguishing between physically present and non-existent memory devices are already known in the art. In a first example, as described in U.K. patent specification No. 1,486,430, upper and lower address limits for each of a plurality of memory modules are automatically generated to maintain continuous address boundaries between the modules, even when the modules are replaced by modules of different storage capacities. Each address supplied by a processor over an address bus is compared in each module with the corresponding upper and lower limit addresses to produce an output when the address lies between the limits for that module, the output enabling the module's memory matrix. In a second example, as described in U.K. patent specification No. 1,468,783, a memory system in which the number and sizes of memory hardware modules are variable includes means for applying at least part of a word address to each module present, together with writable control means responsive to some of the bits of the address to apply to the module access-enabling signals generated as a function of these bits and of the current contents of the control means, module addressing thus being adjustable by varying the contents of the control means, e.g. according to module availability. In a third example, as described in European patent specification No. 0.028,312(A1) a data processing system has a non-volatile memory device adapted to contain data as to the availability of add-on read-only memories in the system, reference being made to this data during system operation. In a fourth example, as described in U.K. patent specification No. 1,430,486, a data processing system has a sectioned memory which is addressed from a memory address register to read out data to a data register. If an address does not correspond to a storage location in a memory section which is present in the system an output signal is generated from checking circuits. The checking circuits comprises in respect to each (notional) memory section, a logic circuit which is connected to receive a conditioning signal signifying the presence of the memory section concerned, when provided. At the start of a memory cycle of operation a command signal designates the memory section containing a storage location to be addressed. The appertaining logic circuit produces an output signal in response to the command signal, but only if it is also receiving the conditioning signal, to indicate that the storage location which is to be addressed is physically present.

It is an object of the present invention to provide improved and simpler means for distinguishing between physically present and nonexistent memory devices. By virtue of its simplicity, the invention affords particular advantage as applied to relatively small digital data apparatus employing microprocessors or minicomputers and variable size memory.

SUMMARY OF THE INVENTION

According to the present invention digital data apparatus comprising a data processing unit and a plurality of peripheral units selectively addressable by the data processing unit over an address but with bi-level address codes for the transfer of digital data between the data processing unit and an addressed peripheral unit over a data bus, each peripheral unit having a special storage location for the storage of a multi-bit identification code which identifies uniquely the peripheral unit, characterized in that the data processing unit includes interrogation means for testing the presence of a peripheral unit corresponding to an address code applied to the address bus, said interrogation means comprising first means for requesting from that addressed peripheral unit during an interrogation period the transfer of its identification code to the data processing unit over the data bus for comparison with a corresponding code in the data processing unit, second means for causing at least one data line of the data bus to assume during said interrogation period an inverse active level which is opposite to the proper active level on that data line in response to a correct application of the relevant bit of the identification code on that data line, said inverse active level being de-activated by said second means in the presence of the proper active level on the data line, and third means for sensing as part of said comparison the prevailing active level of the data line.

Thus, the third means will always sense correctly either the presence or the absence of a peripheral unit corresponding to an applied address code, because the data line concerned will always be at either the proper active level when the peripheral unit is provided or the inverse active level when the peripheral unit is not provided. This correct sensing avoids the possibility of the data processing unit falsely accepting those address codes which are invalid because no peripheral units are provided in respect of them. This possibility could otherwise occur because, without the provision of the present invention, the data lines of the data bus can assume erroneously respective active levels which together could form a "spurious" identification code which can signify incorrectly the presence of a (non-existent) peripheral unit. These erroneous active levels can be due to the line capacitance which remains on the data lines from previous addressing/data cycles on the data bus, or it can be due to capacitive coupling between the data lines and other adjacent signal lines.

In carrying out the invention, the identification code allocated to each peripheral unit is suitably the same as the address code for the peripheral unit, thereby simplifying the logic of the data processing unit. Conveniently, an addresser circuit in the data processing unit can then be used on setting up of the apparatus (and possibly periodically during use of the apparatus) to effect a counting sequence to produce successive addresses which are recorded in the storage locations of the respective peripheral units.

The data bus can be used additionally for addressing the storage location of a peripheral unit which is addressed over the address bus. The data bus can be further used on a multiplex basis as a combined data/address bus for addressing other storage or other elements of a peripheral unit which is addressed over the address bus. This advantageous use of bus capacity (and thus of integrated circuit connecting pins), albeit at the expense of speed of operation of the apparatus compared with the use of a separate "auxiliary" address bus, could be further extended to combine also the address bus with the combined data/address bus on a multiplex basis.

In a preferred embodiment of the invention, said interrogation period is divided into a first part in which said first means is operable, and second and third parts in which said second means is operable, said second means comprising a low impedance current driver circuit which is operable to pre-charge the data line to the inverse active level in the second part and a high impedance current driver circuit which is operable to tend to maintain the pre-charged state of the data line in the third part, and each peripheral unit includes a low impedance current driver circuit which is operable when the unit is addressed to charge (with the relevant bit of the identification code) the data line to the proper active level in the third part, nonwithstanding the operation of the high impedance current driver circuit.

BRIEF DESCRIPTION OF THE DRAWINGS

In order that the invention may be more fully understood reference will now be made by way of example to the accompanying drawings, in which.

DESCRIPTION OF THE PREFERRED EMBODIMENT

Figure 1:
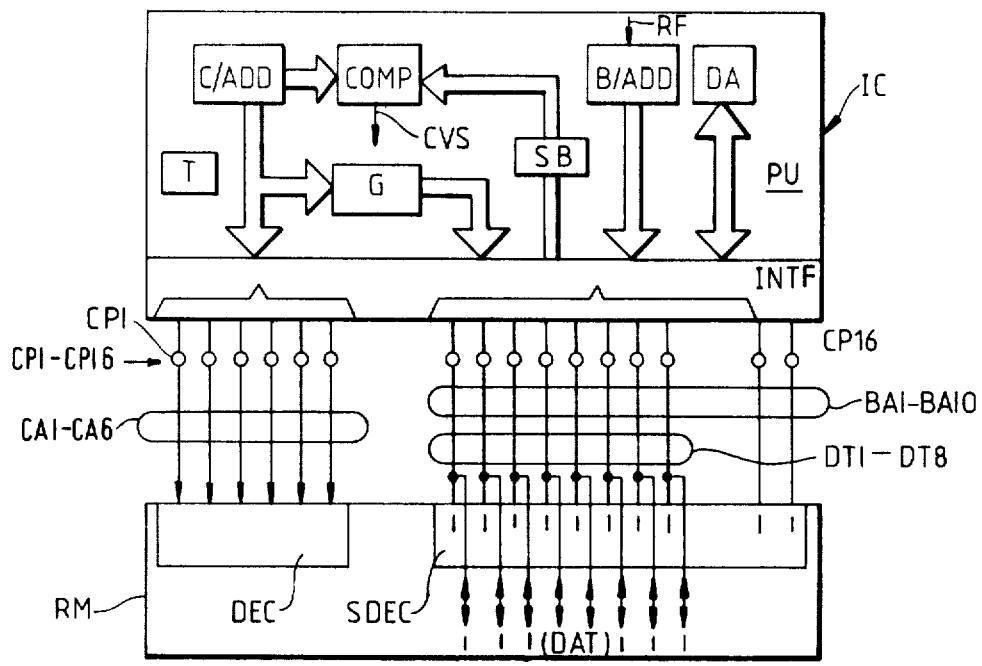
FIG. 1 shows diagrammatically one example of specific digital data apparatus of the character referred to having a digitally operable processing unit and associated random access memory (RAM) equipment.

In the following description of the apparatus which is exemplified in the drawings, it will be assumed that memory is connected to the processing unit as a plurality of memory units each of the same number of bytes, this number corresponding to the smallest size of memory unit which is envisaged. Such a smallest size of memory unit will be deemed to be a 'chapter' of memory for the purposes of the present description. These memory units can be respective memory devices each containing one 'chapter' of memory, or a larger size memory device can be considered as a plurality of memory units each containing one 'chapter' of memory. Each such larger size memory device would always contain an integral number of 'chapters' of memory. Thus, as an example, a 'chapter' might be 1024 bytes of 8 bits, and 1, 2 and 4 'chapter' size Random Access Memory (RAM) devices might be available for use.

Referring now to the drawings, the digital data apparatus shown in FIG. 1 comprises an integrated circuit IC containing a processing unit PU and an interface circuit INTF which are interconnected internally in the integrated circuit IC. The integrated circuit IC has sixteen external connecting pins CP1 to CP16 by which external connection is made to RAM equipment RM. (The integrated circuit IC would, of course, have further external connecting pins (not shown) for applying thereto supply voltages, and for clock and control signals, etc.) The RAM equipment RM has a maximum storage capacity of $64 \times 1024 \times 8$ bits (i.e. it is a 64K8 RAM) and it can therefore comprise up to 64 memory units each containing one 'chapter' of memory for the chapter size example given above. The RAM equipment RM would, in practice, be composed of an appropriate number of discrete RAM devices of requisite chapter size.

The RAM equipment RM includes, or has associated with it, a decoder DEC which is connected to connecting pins CP1 to CP6 of the integrated circuit IC by way of a 6-line address bus consisting of parallel address lines CA1 to CA6. A binary 6-bit chapter address code applied from the processing unit PU to the decoder DEC over this address bus will cause the decoder DEC to produce a 'unit' select signal which uniquely selects 1-out-of-64 possible memory units in the RAM equipment RM. These 6-bit address codes constitute valid or invalid addresses, respectively, according as the particular memory unit which each code identifies is present or not.

A 10-line address bus connected to connecting pins CP7 to CP16 and consisting of parallel address lines BA1 to BA10, carries binary 10-bit byte address codes for identifying the 1024 8-bit bytes contained in each memory unit. This identification is effected using a second decoder SDEC for converting the 10-bit address codes into suitable 'byte' select signals.

Of the address lines BA1 to BA10, the first eight (BA1 to BA8) also serve as data lines DT1 to DT8 which form an 8-line data bus for the transfer of data (DAT) between the integrated circuit IC and the RAM equipment RM. The direction of data transfer is controlled from the processing unit PU. The address/data bus (BA1 to BA10, DT1 to DT8) is used on a multiplex basis in different time intervals for either byte addressing or data transfer, this multiplexing also being controlled from the processing unit PU. As an alternative, a separate 8-line data bus can be provided, but this requires an additional eight connecting pins on the integrated circuit IC.

Figure 2:
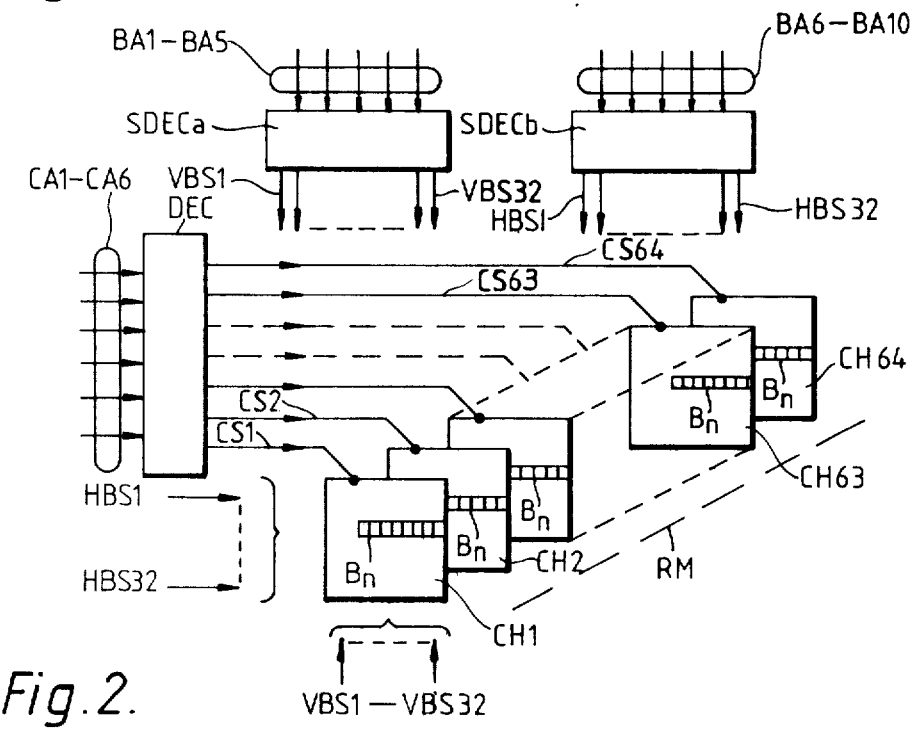
FIG. 2 shows diagrammatically the organization of memory units in the RAM equipment of the apparatus in FIG. 1.

FIG. 2 shows schematically the addressing of the chapter size memory units, together with the addressing of the memory unit 8-bit bytes, in the RAM equipment RM. The 64 memory units CH1, CH2 . . . CH64 have respective 'unit' select leads CS1, CS2 . . . CS64 connected to them. A 'unit' select signal on a chosen one of these select leads, as determined by the decoder DEC in accordance with the particular 6-bit code on the address lines CA1 to CA6, will select the relevant memory unit for data transfer. When less than the full number (64) of memory units is provided, the 'unit' select leads pertaining to omitted memory units are not used and thus correspond to invalid addresses. However, because of the provision of the decoder DEC, each memory unit which is present is identified by a unique 6-bit address code on the address lines CA1 to CA6. The second decoder SDEC can be considered as comprising two parts SDECa and SDECb, each of which is responsive to 5-bit codes on the address lines BA1 to BA5 or BA6 to BA10, to produce a 'byte' select signal on a particular 1-out-of-32 select leads VBS1 to BVS32 or HBS1 to HBS32. These two 'byte' select signals constitute coordinate matrix select signals by which a particular 1-out-of-1024 (32×32) bytes $B_n$ can be selected from the relevant memory unit.

Turning again to FIG. 1, the processing unit PU includes a first addresser circuit C/ADD for producing the 6-bit chapter address codes for application to the address bus CA1 to CA6. Additionally, these 6-bit address codes are applied periodically via a gate circuit G to the data bus DT1 to DT8 to be recorded as identification codes in six of the bit positions of a specially allocated storage location (byte) in a respective one of these memory units which are provided and for which the corresponding address code is therefore valid. (The remaining two bit positions of the storage byte are not needed and would be filled with 0's). The specially allocated storage byte is the same byte in each memory unit and is identified, both for recording into and for reading from, by the appropriate byte address code as produced by a second addresser circuit B/ADD, which produces the 10-bit byte address codes, in response to a RAM finder signal on lead RF. The processing unit also includes a comparator COMP which is operable, when a chapter address code applied to the address bus CA1 to CA6 is being tested for validity during an interrogation period, to compare this address code with the (corresponding) identification code which is (purportedly) read from the storage byte of the memory unit corresponding to the chapter address code being tested. If these two codes agree then the comparator COMP produces a chapter valid signal on a lead CVS, and the processing unit PU knows that for that address code a memory unit has been provided in which data can be stored. A timing circuit T in the processing unit PU provides suitable timing signals. The processing unit PU also includes a data circuit DA for supplying data to and receiving data from the data bus DT1 to DT8.

As mentioned previously, certain capacitive conditions on the data lines of the data bus DT1 to DT8 can give rise to spurious identification code bits being present. In order to ensure that a received identification code is positively either a bona fide code or not such a code, there is included in the processing unit PU in respect of at least one (test code) bit of the identification code a buffer circuit SB which is operable during the interrogation period to cause the data line pertaining to that test code bit to assume during the interrogation period an inverse active level which is opposite to the proper active level which that data line should assume when the correct test code bit is present on it. As will be described next with reference to FIG. 3, the current intensities which are involved in the establishment of the inverse and proper active levels are such that, in the absence of the correct test code bit the inverse active level can be detected by the comparator COMP to signify the non-existence of a memory unit for the address code being tested, whereas in the presence of the correct test code bit the proper active level prevails over the inverse active level and is detected by the comparator COMP to signify the existence of a memory unit for the address code being tested.

Figure 3:
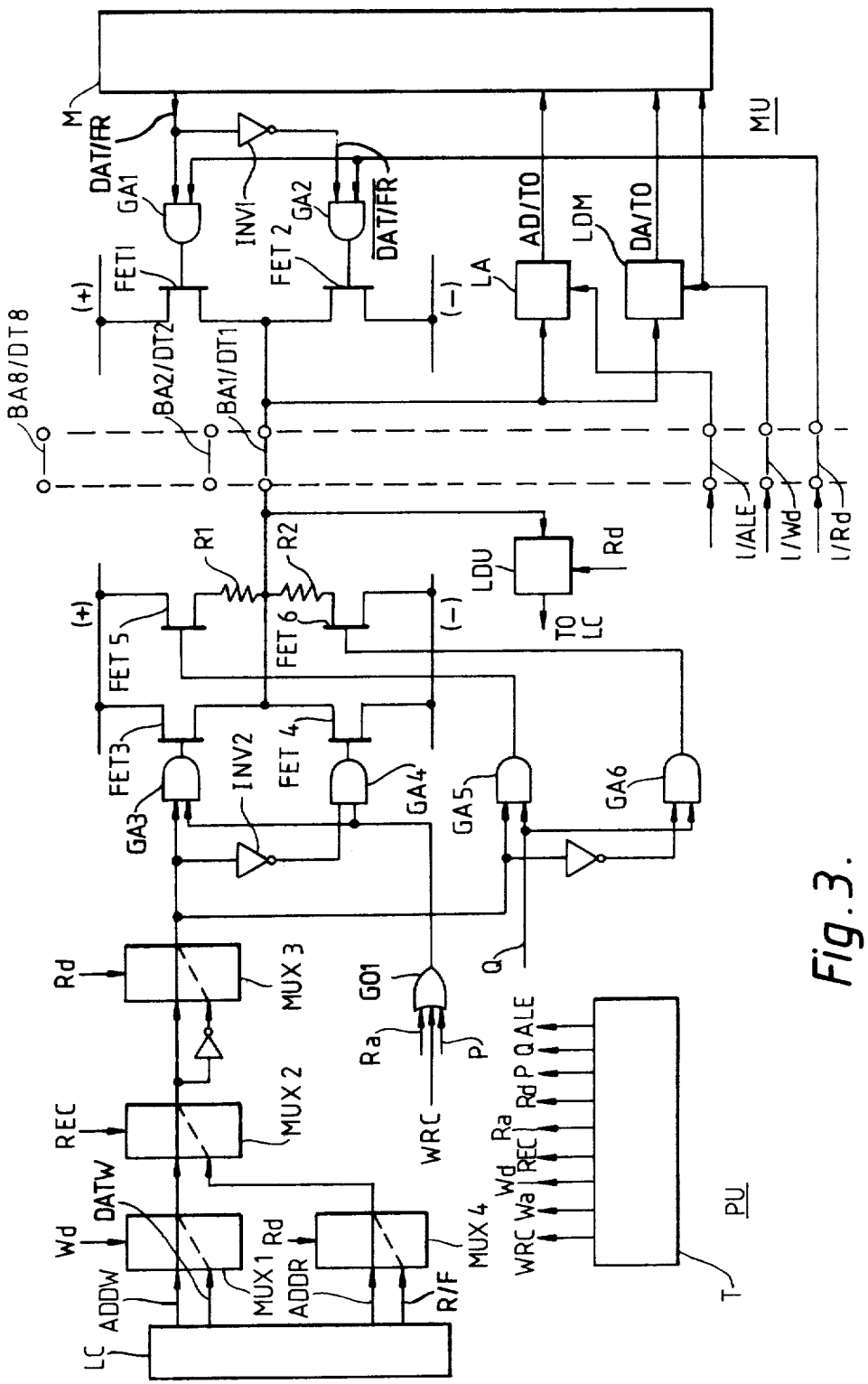
FIG. 3 shows diagrammatically a circuit portion of the apparatus in FIG. 1.

The circuit portions shown in FIG. 3 include elements of the processing unit PU and elements of a memory unit MU which are interconnected by way of the address/data line BA1/DT1 and control lines 1/Rd, 1/Wd and 1/ALE. The elements in the memory unit MU comprise a low impedance current driver consisting of two field-effect transistors FET1 and FET2 which have their current paths connected in series between supply rails (+), (−). When transistor FET1 conducts the line BA1/DT1 assumes a high active level which corresponds to the binary value '1'. When transistor FET2 conducts the line BA1/DT1 assumes a low active level which corresponds to the binary value '0'. The conductive states of the transistors FET1 and FET2 are controlled by respective AND-gates GA1 and GA2 which at one input receive, respectively, over a lead DAT/FR the data bit and the inverse of that bit $\overline{\text{DAT/FR}}$ (due to an inverter INV1) from the relevant bit location of an addressed 8-bit storage location in the multi(1024)-storage location memory M of the memory unit MU. A second input of each of the gates GA1 and GA2 is connected to receive a "read data" pulse Rd from the processing unit PU over the control line 1/Rd. Thus, when in the memory M a particular 8-bit storage location is addressed and the pulse Rd is present, a '1' data bit in the relevant bit location will cause the gate GA1 to produce an output which renders transistor FET1 conductive so that the data line BA1/DT1 assumes the high active level. Similarly, a '0' data bit in that bit location will cause the gate GA2 to produce an output which renders transistor FET2 conductive so that the data line BA1/DT1 then assumes the low active level. There would be one such low impedance current driver and associated AND-gates for each of the other address/data lines BA2/DT2 to BA8/DT8.

The memory unit MU further comprises two latches LA and LDM. The latch LA is an address latch and there would be one such address latch for each of the 10 bits of the byte address codes. These address latches are operated by an "address latch enble" pulse ALE applied from the processing unit PU over the control line 1/ALE to hold over leads such as AD/TO an applied byte address code for the reading of data from, or the writing of data into, the storage location identified by that byte address code. The other latch LDM is a data latch which is operated by a "write data" pulse Wd applied to it over the control line 1/Wd from the processing unit PU. There would be one such data latch for each of the 8-bits of a data byte and these data latches are operated by the pulse Wd to hold over leads such as DA/TO a data byte prior to writing it into the relevant addressed storage location of the memory M.

The processing unit PU similarly comprises at the other end of the address/data line BA1/DT1 a low impedance current driver consisting of two field-effect transistors FET3 and FET4 which have their current paths connected in series between supply rails (+), (−), together with respective AND-gates GA3 and GA4 and an inverter INV2. Also, a data latch LDU, which is operated by the pulse Rd, is connected to the line BA1/DT1. The processing unit also includes a timing circuit T for supplying the pulses Rd, Wd and ALE, and also further pulses whose purpose will be considered presently.

Figure 4:
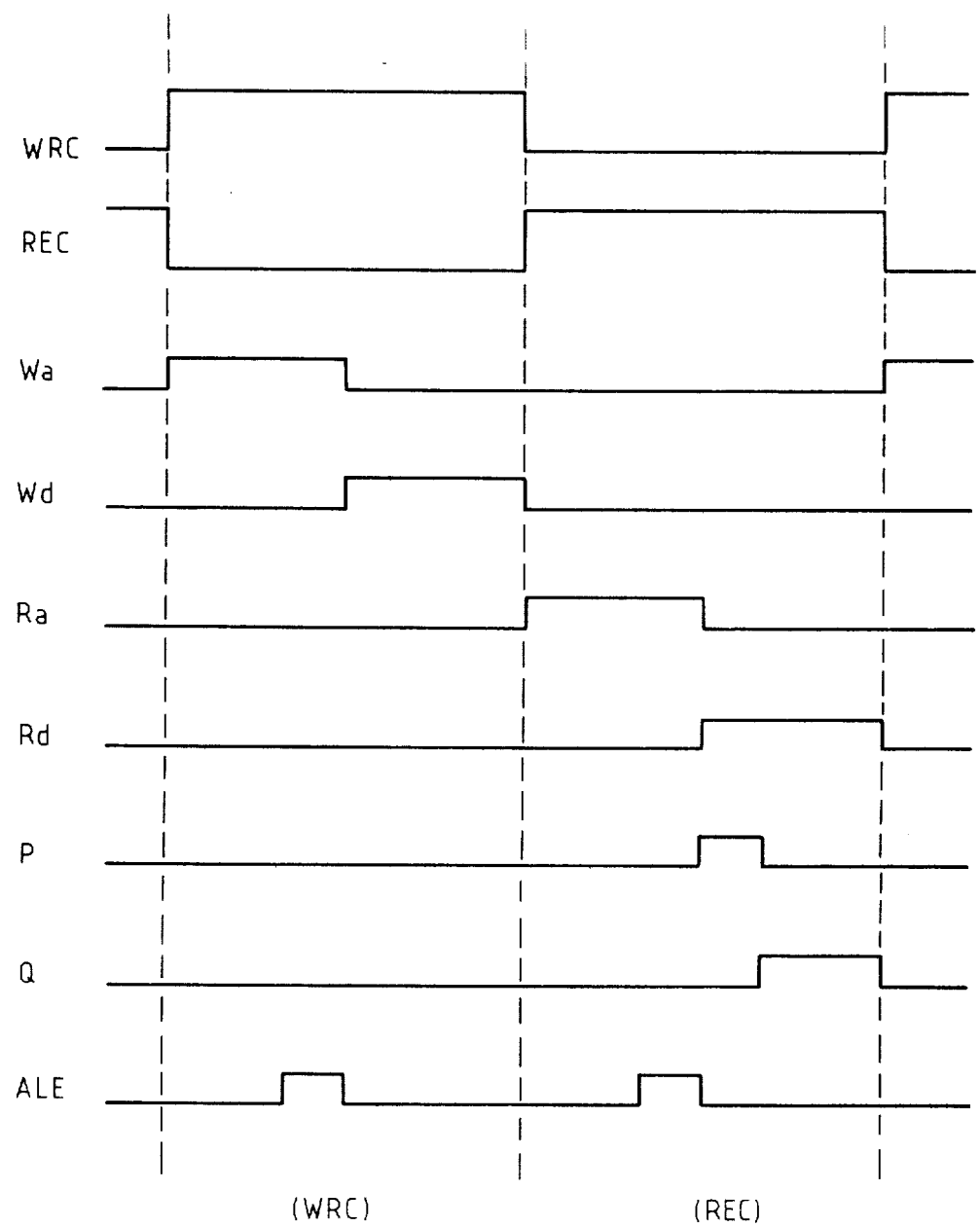
FIG. 4 shows idealized pulses which illustrate the operation timing of the circuit portion in FIG. 3.

As illustrated by the idealized pulse waveforms shown in FIG. 4, a "write" pulse WRC defines a write cycle WRC of operation and a "read" pulse REC defines a read cycle REC of operation, for the interchange of data between the processing unit and a selected memory unit.

The write cycle WRC comprises a first period which is defined by a "write address" pulse Wa and a second period which is defined by the "write data" pulse Wd. For writing data into a storage location of a memory unit that has been selected by the appropriate chapter address code, a logic circuit LC of the processing unit applies over leads such as lead ADDW during the period of the "write address" pulse Wa, the byte address code for that storage location to the low impedance current drivers (such as drivers FET3/FET4) which are connected at the processor unit end of the address-/data bus. Within this period an "address latch enable" pulse ALE occurs so that the byte address code is latched into the latches such as LA in the addressed memory unit MU. This byte address code is fed from the logic circuit LC to the AND-gates such as GA3 and GA4 by way of three multiplexers MUX1, MUX2 and MUX3. The multiplexer MUX1 is switched by the "write data" pulse Wd, so that in the second period of the write cycle as defined by the pulse Wd, data from the logic circuit on leads such as lead DATW is applied through the multiplexer MUX1 and through the multiplexers MUX2 and MUX3 (which remain unswitched during the write cycle WRC) and over the address/data bus to the addressed memory unit MU where it is latched into the latches such as LDM in the addressed memory unit MU by the pulse Wd as present on line 1/Wd. Thereafter, the pulse Wd activates the addressed byte of the memory M to record the latched data therein. Throughout the entire write cycle, the AND-gates such as gates GA3 and GA4 are held open by the "write" pulse WRC which is applied to one input of these gates by way of an OR-gate GO1.

The read cycle REC comprises a first period which is defined by a "read address" pulse Ra and a second period which is defined by a "read data" pulse Rd. To select a storage location for reading therefrom, the logic circuit LC applies the appropriate byte address code to leads such as lead ADDR. This address code passes through a further multiplexer MUX4 which is unswitched at this time, through the multiplexer MUX2 which is now switched by the "read" pulse REC, through the multiplexer MUX3 which is still unswitched, to the low impedance current drivers such as drivers FET3/FET4 for application to the address/data bus. During the period of the pulse Ra, the gates such as GA3 and GA4 are held open by the output from OR-gate GO1, which has the pulse Ra applied to one of its inputs. This byte address code is latched into the address latches such as latch LA by the next pulse ALE which also occurs in the period of the pulse Ra. During the second period of the read cycle REC as defined by the pulse Rd, data is read from the addressed storage location and latched into the latches such as latch LDU in the processing circuit PU from whence it is fed to the logic circuit LC.

The processing unit PU is also arranged in accordance with the invention, to perform a special read cycle in order to determine whether a chapter address code which it wishes to use for addressing a memory unit does in fact pertain to a memory unit which is actually provided, and is thus a valid chapter address code. As mentioned previously with reference to FIG. 1, in each memory unit which is provided there is allocated a particular storage location in which is recorded a unique identification code for the memory unit. In the special read cycle, the byte address for this particular storage location is applied by the logic circuit LC to the leads such as lead ADDR so that the identification code can be read from this particular storage location during the second period of the read cycle REC as defined by the pulse Rd. In respect of at least one of the address-/data lines, the logic circuit LC also supplies on a lead such as lead R/F a bit corresponding to that of the identification code on the address/data line. During the period of the pulse Rd, the multiplexer MUX4 is switched so that it passes this bit, as does also the switched multiplexer MUX2. The multiplexer MUX3 is also switched during the period of the pulse Rd, so that an inverted version of the bit which serves as a test bit is applied to the AND-gates GA3 and GA4. The period of the pulse Rd is divided into two parts by means of pulses P and Q, as shown in FIG. 4. The part defined by the pulse P constitutes a charging period during which the gates GA3 and GA4 are opened by the output from OR-gate GO1 to charge up the address/data line to the active level determined by the test bit.

The processing unit PU also includes in respect of the address/data line BA1/DT1 a high impedance current driver which comprises two field-effect transistors FET5 and FET6 which have their current paths connected in series between the supply rails (+), (−). As signified by resistances R1 and R2, these current paths are of relatively high impedance compared with those of the transistors in the low impedance current drivers. The transistors FET5 and FET6 are controlled by the outputs from respective further AND-gates GA5 and GA6 which have one input connected to the output of the multiplexer MUX3 and the other input connected to receive the pulse Q. The period of the pulse Q constitutes a charge maintaining period during which the high impedance current driver FET5/FET6 tends to maintain the address/data line BA1/DT1 at the active level to which it was charged during the period of the pulse P. If there is no memory unit corresponding to the chapter address code, so that no identification code is returned over the address/data bus during the period of the pulse Rd, the latch LDU in the processing unit will latch the (inverse) active level due to the high impedance current driver and this will be detected in the logic circuit LC (COMP—FIG. 1) to signify that the chapter address code is invalid. However, if there is a memory unit corresponding to the chapter address code, then the relevant bit of the identification code of that memory unit when applied to the address/data line BA1/DT1 will cause that line to be charged to the correct active level due to the low impedance current driver FET1/FET2 providing a greater current intensity on the address/data line than the high impedance current driver FET5/FET6. As a result, this opposite but correct active level will be latched by the latch LDU and this will now be detected in the logic current LC (COMP—FIG. 1) to signify that the chapter address code is valid. Thereafter the memory unit concerned is known by the logic circuit LC to exist.

As a possible modification, the high impedance current driver FET5/FET6 could be dispensed with in cases where sufficient of the inverse active level charge due to operation of the low impedance current driver FET3/FET4 in the period of the pulse P, remains in the period of the pulse Q to provide the invalid chapter address indication in the absence of the relevant bit of the identification code.

I claim:

1. Digital data apparatus comprising a data processing unit and a plurality of peripheral units selectively addressable by the data processing unit over an address bus with bi-level address codes for the transfer of digital data between the data processing unit and an addressed peripheral unit over a data bus, each peripheral unit having a special storage location for the storage of a multi-bit identification code which identifies uniquely the periheral unit, characterized in that the data processing unit includes interrogation means for testing the presence of a peripheral unit corresponding to an address code applied to the address bus, said interrogation means comprising first means for requesting from that addressed peripheral unit during an interrogation period the transfer of its identification code to the data processing unit over the data bus for comparison with a corresponding code in the data processing unit, second means for causing at least one data line of the data bus to assume during said interrogation period an inverse active level which is opposite to the proper active level on that data line in response to a correct application of the relevant bit of the identification code on that data line, said inverse active level being de-activated by said second means in the presence of the proper active level on the data line, and third means for sensing as part of said comparison the prevailing active level of the data line.

2. Digital data apparatus as claimed in claim 1, characterized in that the identification code allocated to each peripheral unit is the same as the address code for the peripheral unit.

3. Digital data apparatus as claimed in claim 2, characterized in that an addresser circuit in the data processing unit is operable to effect a counting sequence to produce successive addresses which are recorded in the storage locations of the respective peripheral units.

4. Digital data apparatus as claimed in claim 2 or claim 3, characterized in that the data bus is used additionally for addressing the storage location of a peripheral unit which is addressed over the address bus.

5. Digital data apparatus as claimed in claim 4, characterized in that the data bus is further used on a multiplex basis as a combined data/address bus for addressing other storage or other elements of a peripheral unit which is addressed over the address bus.

6. Digital data apparatus as claimed in claim 5, characterized in that said address bus is combined with the combined data/address bus on a multiplex basis.

7. Digital data apparatus as claimed in any one of claims 2 or 3, characterized in that said interrogation period is divided into a first part in which said first means is operable, and second and third parts in which said second means is operable, said second means comprising a low impedance current driver circuit which is operable to pre-charge the data line to the inverse active level in the second part and a high impedance current driver circuit which is operable to tend to maintain the pre-charged state of the data line in the third part, and each peripheral unit includes a low impedance current driver circuit which is operable when the unit is addressed to charge the data line to the proper active level in the third part, notwithstanding the operation of the high impedance current driver circuit.

8. Digital data apparatus as claimed in claim 7, characterized in that the low impedance current driver circuit in the data processing unit and the low impedance current driver circuit in each peripheral unit are otherwise normally used for data transfer between the data processing unit and the peripheral unit over the data bus.

9. Digital data apparatus as claimed in claims 1 or 2 or 3 characterized in that said data processing unit is a digitally operable processing unit and said peripheral units are random access memory units.

10. Digital data apparatus as claimed in claim 9, characterized in that each memory unit contains the same amount of memory.

11. Digital data apparatus as claimed in claim 5, characterized in that said interrogation period is divided into a first part in which said first means is operable, and second and third parts in which said second means is operable, said second means comprising a low impedance current driver circuit which is operable to pre-charge the data line to the inverse active level in the second part and a high impedance current driver circuit which is operable to tend to maintain the pre-charged state of the data line in the third part, and each peripheral unit includes a low impedance current driver circuit which is operable when the unit is addressed to charge the data line to the proper active level in the third part, notwithstanding the operation of the high impedance current driver circuit.

12. Digital data apparatus as claimed in claim 6, characterized in that said interrogation period is divided into a first part in which said first means is operable, and second and third parts in which said second means is operable, said second means comprising a low impedance current driver circuit which is operable to pre-charge the data line to the inverse active level in the second part and a high impedance current driver circuit which is operable to tend to maintain the pre-charged state of the data line in the third part, and each peripheral unit includes a low impedance current driver circuit which is operable when the unit is addressed to charge the data line to the proper active level in the third part, notwithstanding the operation of the high impedance current driver circuit.

* * * * *